United States Patent
Plummer

(10) Patent No.: US 8,246,009 B2
(45) Date of Patent: Aug. 21, 2012

(54) CABLE PULLER WITH PIVOT ADJUSTER FOR CONVERTING BETWEEN UPWARD AND DOWNWARD CABLE PULLING

(75) Inventor: Jeffrey J. Plummer, Rockford, IL (US)

(73) Assignee: Greenlee Textron Inc., Rockford, IL (US)

(*) Notice: Subject to any disclaimer, the term of this patent is extended or adjusted under 35 U.S.C. 154(b) by 1034 days.

(21) Appl. No.: 12/176,809

(22) Filed: Jul. 21, 2008

(65) Prior Publication Data

US 2009/0078921 A1 Mar. 26, 2009

Related U.S. Application Data

(60) Provisional application No. 60/973,796, filed on Sep. 20, 2007.

(51) Int. Cl.
*H02G 1/08* (2006.01)
(52) U.S. Cl. .......... 254/134.3 FT; 254/134.3 R
(58) Field of Classification Search ......... 254/134.3 FT, 254/134.3 R, 389, 403, 407
See application file for complete search history.

(56) References Cited

U.S. PATENT DOCUMENTS

| | | | |
|---|---|---|---|
| 3,968,952 A * | 7/1976 | Newell | 254/134.3 R |
| 5,645,265 A * | 7/1997 | Shu | 254/134.3 FT |
| 6,431,524 B1 * | 8/2002 | Weber | 254/134.3 FT |
| 7,431,267 B1 * | 10/2008 | Cunningham | 254/134.3 FT |
| 7,832,709 B2 * | 11/2010 | O'Connor | 254/134.3 R |
| 7,926,788 B2 * | 4/2011 | Plummer | 254/134.3 FT |
| 7,987,570 B2 * | 8/2011 | Salazar et al. | 29/244 |
| 8,016,267 B2 * | 9/2011 | Jordan et al. | 254/134.3 FT |
| 2007/0221896 A1 * | 9/2007 | Jordan et al. | 254/134.3 FT |
| 2007/0284559 A1 * | 12/2007 | Plummer | 254/134.3 FT |
| 2009/0078921 A1 * | 3/2009 | Plummer | 254/134.3 FT |

* cited by examiner

*Primary Examiner* — Lee D Wilson
(74) *Attorney, Agent, or Firm* — Clark Hill PLC

(57) ABSTRACT

A puller head and cable puller including the puller head are provided for pulling cable in an upward or a downward direction. The puller head includes a frame, a capstan mounted to the frame, and first and second retaining shaft apertures. The puller head is pivotally mounted to a boom of the cable puller through a pivot shaft. The capstan of the puller head is positioned rearward of the boom. The position of an upper most surface of the capstan relative to the boom is changed by pivoting the puller head between upward and downward pulling positions. The puller head is maintained in either the upward or downward pulling position through the use of a retaining shaft.

22 Claims, 10 Drawing Sheets

CABLE PULLER WITH PIVOT ADJUSTER FOR CONVERTING BETWEEN UPWARD AND DOWNWARD CABLE PULLING

This application claims the domestic benefit of U.S. Provisional Application Ser. No. 60/973,796 filed on Sep. 20, 2007, which disclosure is hereby incorporated by reference.

FIELD OF THE INVENTION

This invention is generally directed to a cable puller which can be easily configured to pull cable upwardly or downwardly.

BACKGROUND OF THE INVENTION

Cable pulling is a commonly used technique whereby a pulling rope is attached to a cable or wire that is to be pulled through conduit by a cable puller. The pulling rope is wound by a user around a capstan and tails off the capstan. The capstan is powered by a motor and acts as a frictional force multiplier. The motor and capstan are usually referred to as being part of the puller head of the cable puller. Use of the cable puller to pull the cable through the conduit allows the user to exert only a small force on the rope that tails off of the capstan. This relatively small force is translated into a large force of several thousand pounds which is exerted on the incoming pulling rope and which provides enough force on the pulling rope and the cable to pull them through the conduit. Typically, cable pullers have a conduit attachment device that extends from a boom which is attached to the puller head. The conduit attachment device allows the cable puller to be rigidly secured to the conduit from which the pulling rope and/or cable are to be pulled. The most frequent orientation encountered in cable pulling is the situation where the rope or cable is pulled upward out of the conduit, however, sometimes the opening of the conduit faces downward. In this situation, the cable must be pulled downward out of the conduit. Consequently, there has been a need for cable pullers to be able to pull in either of two modes of operation, an upward pulling mode of operation or a downward pulling mode of operation.

One technique to effectuate the conversion from upward to downward pulling is to flip the entire cable pulling assembly upside down so that the puller head, boom, and conduit attachment device are reversed in spatial orientation to the user and the environment. Once the cable puller has been attached to the conduit, a downward cable pull is possible because the orientation of the capstan to the conduit attachment system and any pulleys or sheaves in between them is the same as when an upward cable pull is being performed. Although this technique works, it has the considerable drawback that the user has to move heavy components until they are upside down. This technique can be extremely time consuming and burdensome. It is particularly difficult to invert large cable pullers which are used to exert forces in the range of thousands of pounds.

Another technique to change the direction of pulling cable has been to provide an additional pulley or sheave located somewhere along the length of the boom between the conduit attachment system and the puller head. This technique provides several disadvantages. To begin, it requires the addition of an extra part thereby increasing the cost of the cable puller. In addition, the interaction between the rope or cable and the additional pulley or sheave creates extra drag and friction which makes pulling the cable more difficult. Another disadvantage provided by the addition of another pulley or sheave is that extra time is needed to feed the pulling rope around the additional pulley or sheave. Finally, use of an extra pulley or sheave introduces an extra step to the cable puller, complicating use of the device and providing another opportunity for user error.

Still another technique used to convert a cable puller from an upward pulling position to a downward pulling position is to provide an idler wheel in front of the cable puller's capstan to interchange the side of the boom on which the rope or cable is positioned. For example, to perform an upward pull, typically the rope is positioned on the top side of the boom but if a downward pull is to be performed, the user typically routes the rope about the idler wheel so that the rope is positioned on the lower side of the boom. This technique, however, also suffers from the cost and time consumption disadvantages discussed for the previous techniques.

Therefore, a need for a method for switching between upward and downward cable pulling that is less time consuming, more cost effective, and more efficient than has been previously devised still exists.

The present invention provides a cable puller which overcomes the problems presented in the prior art and which provides additional advantages over the prior art. Such advantages will become clear upon a reading of the attached specification in combination with a study of the drawings.

SUMMARY OF THE INVENTION

Briefly, the present invention discloses a cable puller which can be easily converted between upward pulling and downward pulling positions. The cable puller includes an attachment system removably attached proximate a front end of the boom, a puller head moveably attached to a rear end of the boom, and a base attached to the puller head and the boom to support the cable puller.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
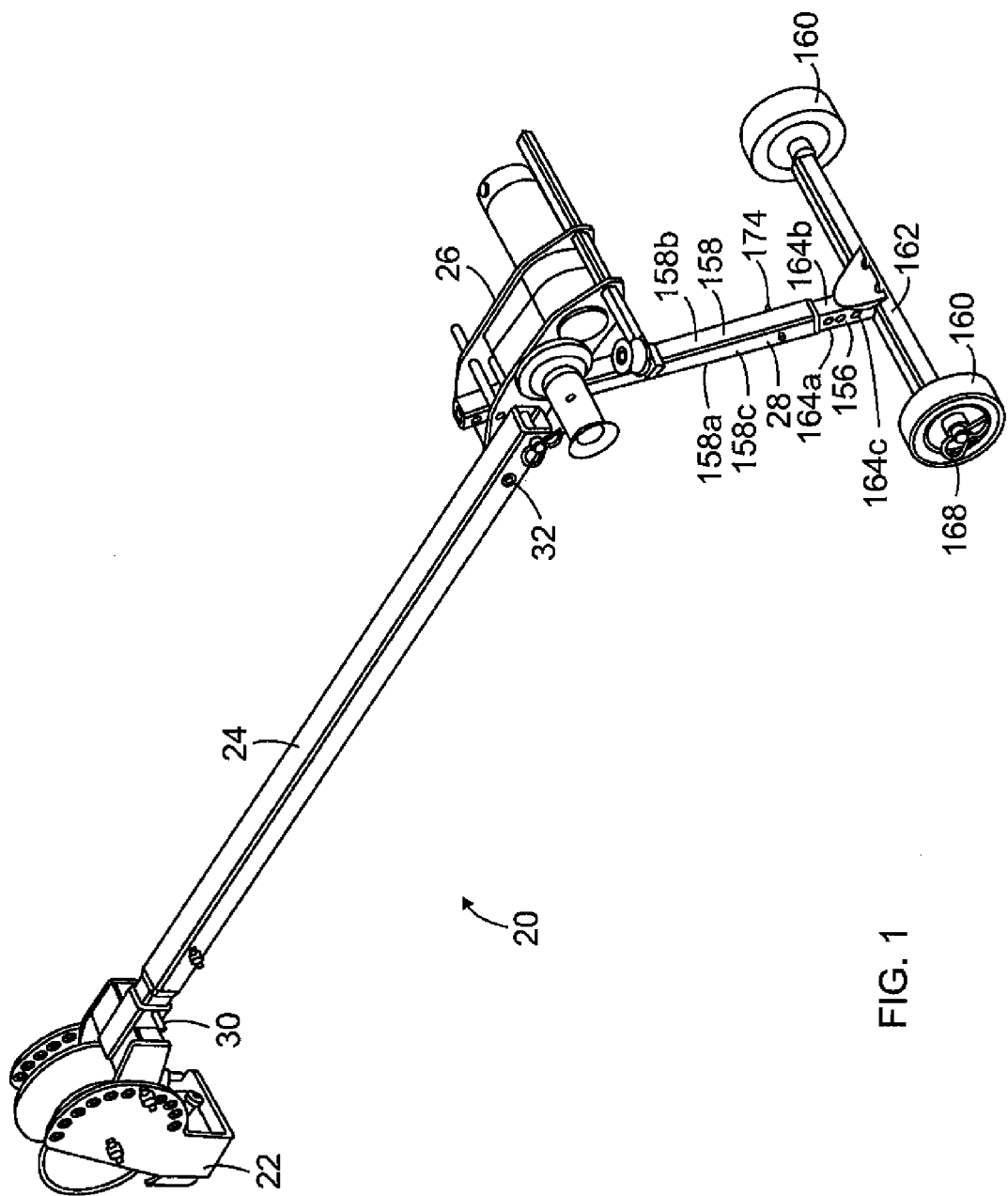
FIG. 1 is a perspective view of a cable puller of the present invention in an upward cable pulling position.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 2:
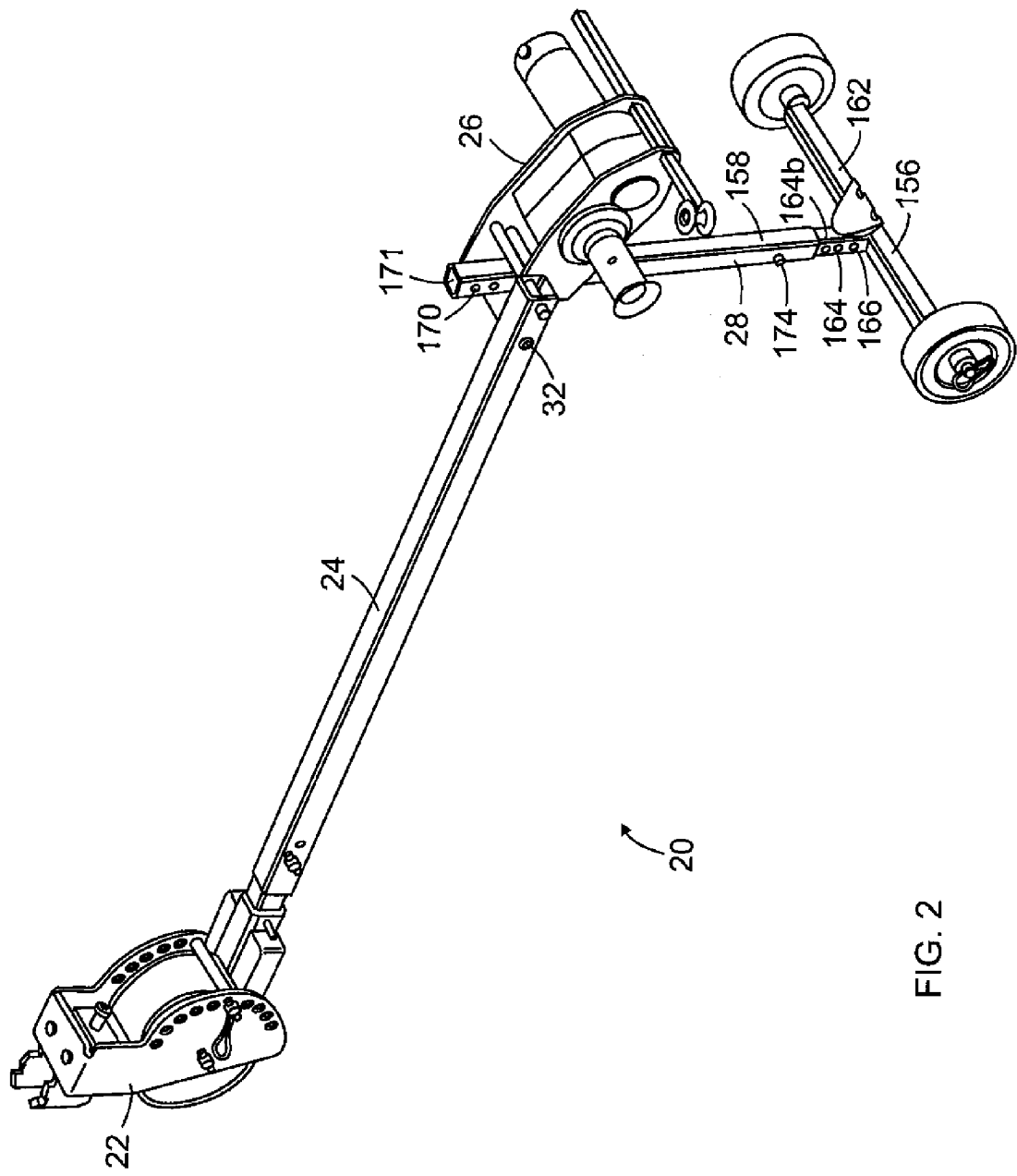
FIG. 2 is a perspective view of the cable puller of FIG. 1 in a downward cable pulling position.
Figure 7:
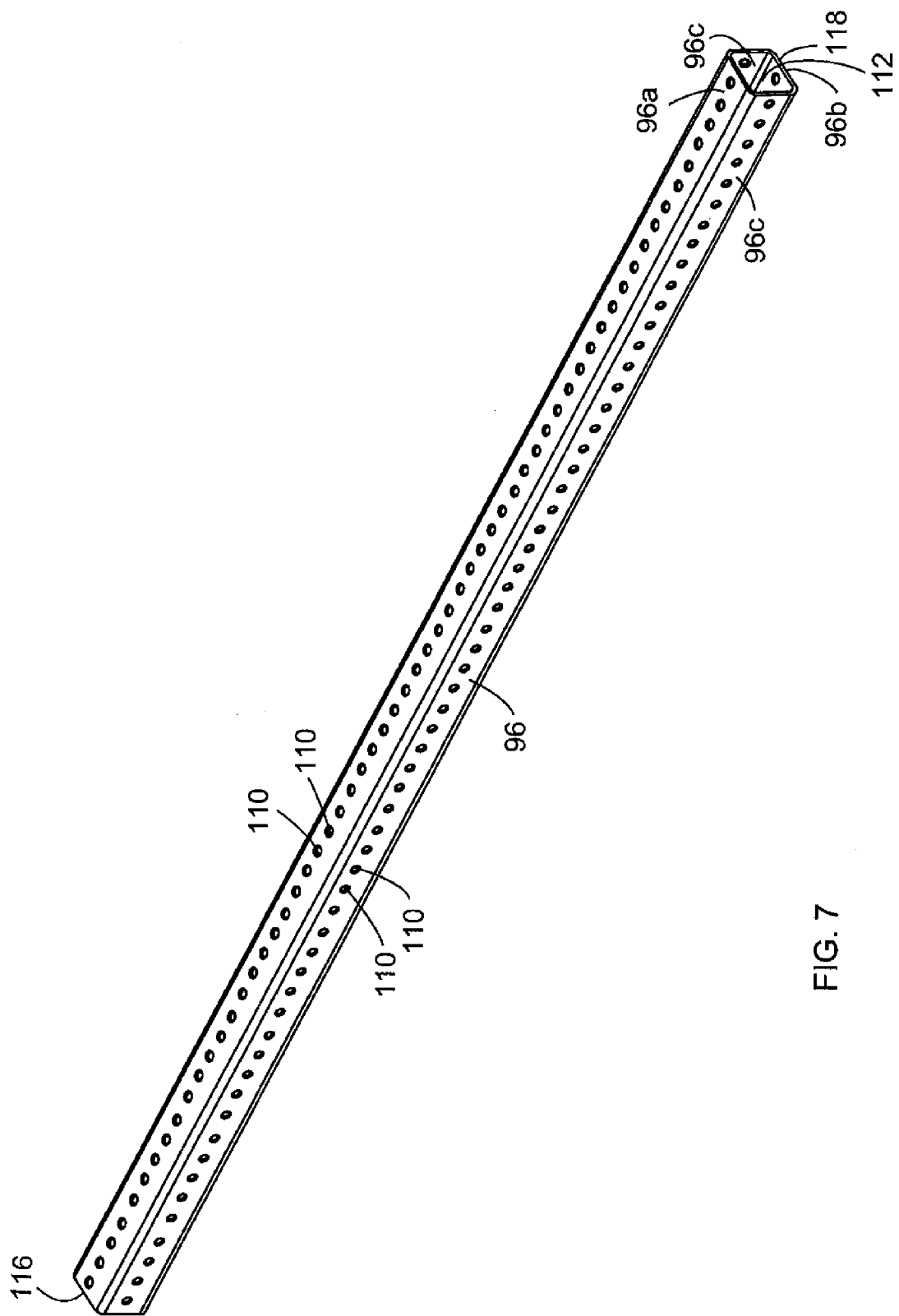
FIG. 7 is a perspective view of the inner member of the boom of the cable puller.
Figure 8:
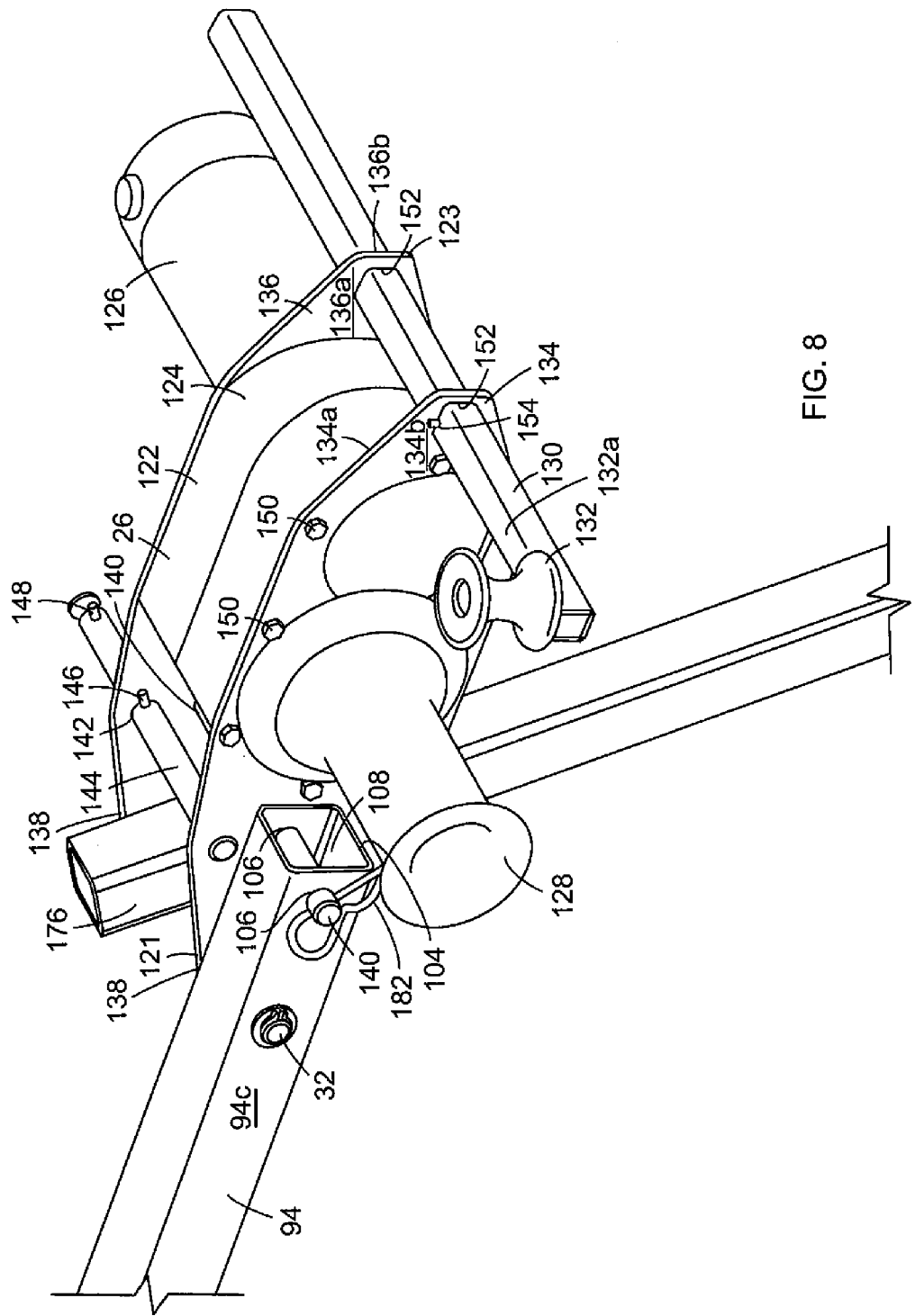
FIG. 8 is an enlarged perspective view of the puller head of the cable puller in an upward pulling position, along with a portion of the base and a portion of the boom.
Figure 9:
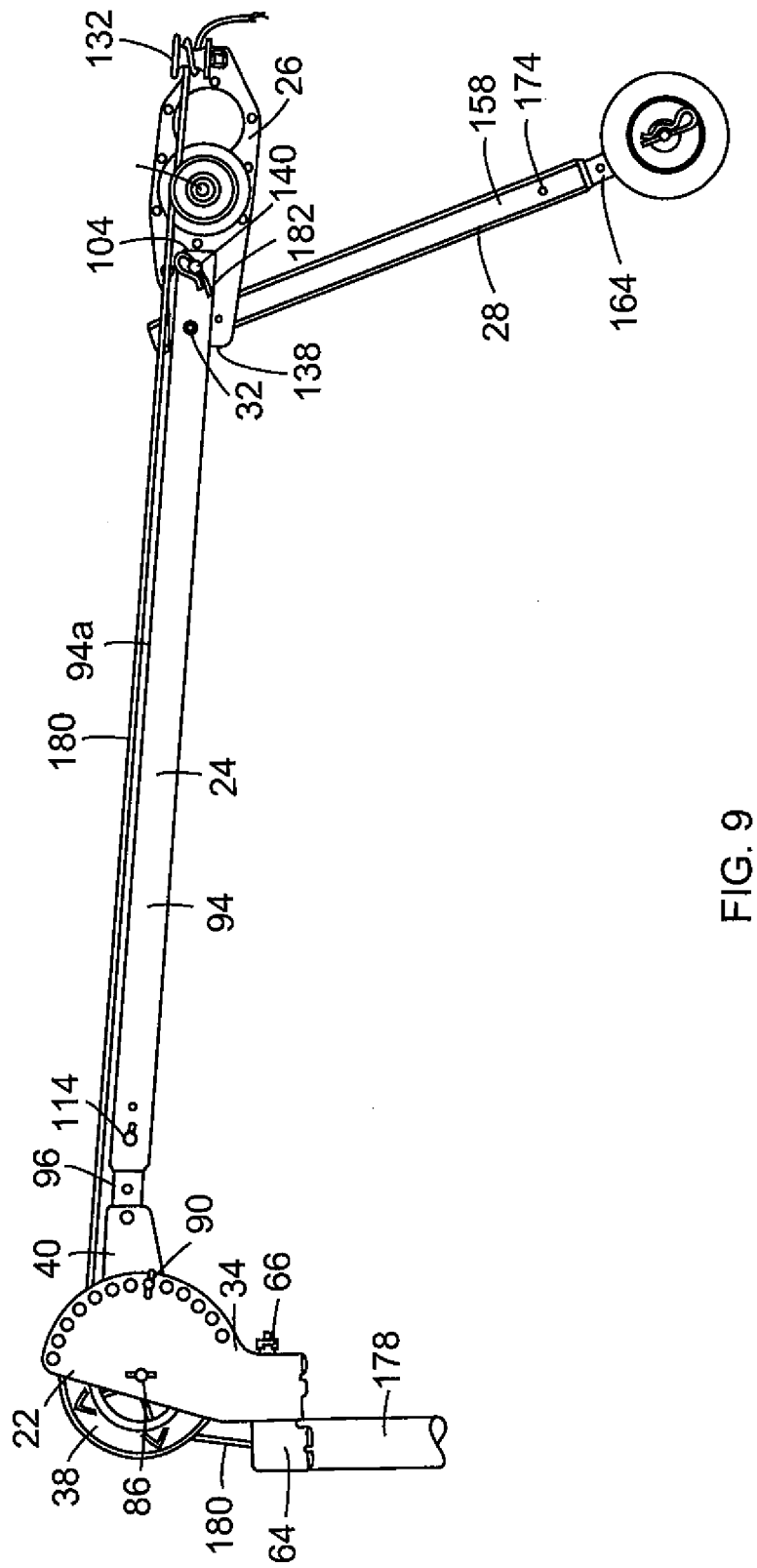
FIG. 9 is a side elevational view of the cable puller with a pulling rope to be pulled positioned thereon, the cable puller being mounted to a conduit and shown in an upward pulling position.
Figure 10:
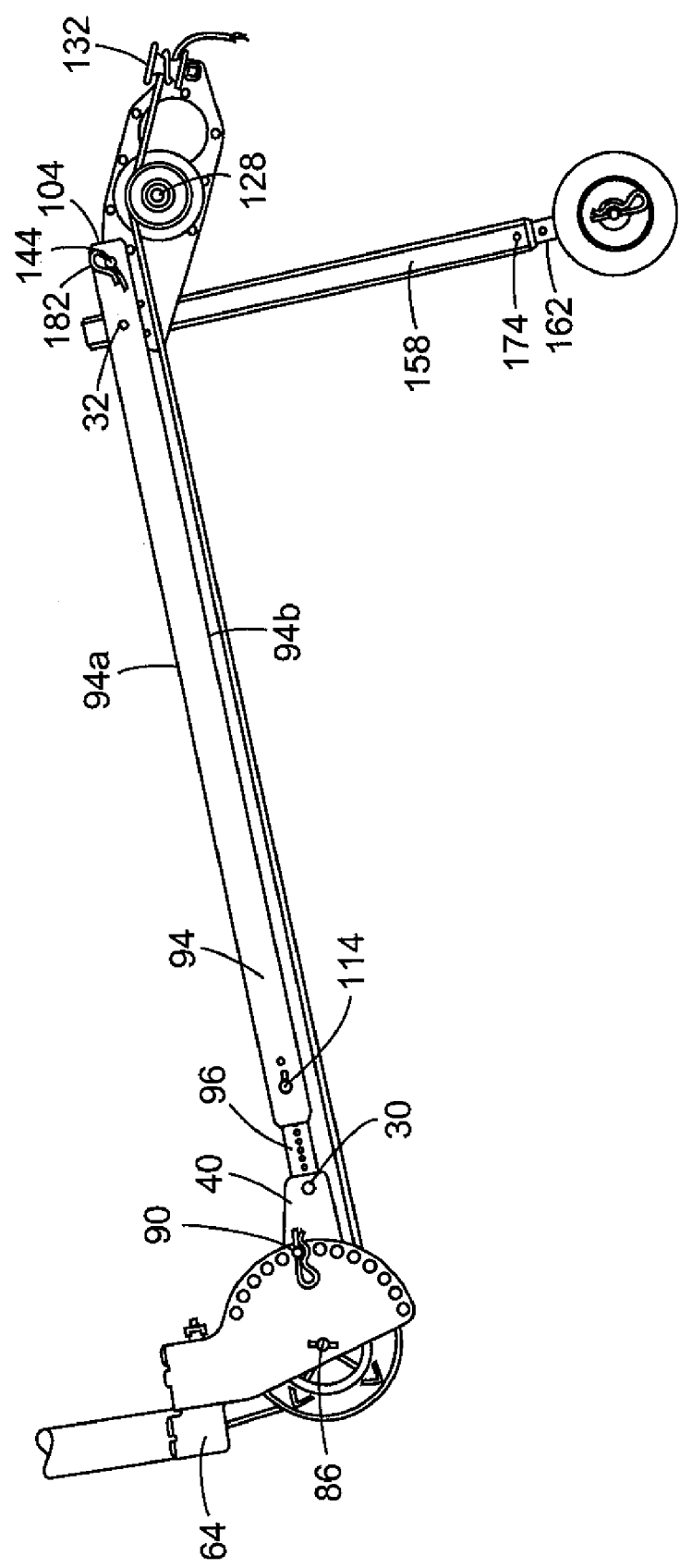
FIG. 10 is a side elevational view of the cable puller with a pulling rope to be pulled positioned thereon, the cable puller being mounted to a conduit and shown in a downward pulling position.

A preferred embodiment of the cable puller 20 is shown in FIGS. 1-10 and is described herein. The cable puller 20 is easily configured to pull cable up through a conduit as shown in FIGS. 1 and 9 or to pull cable down through a conduit as shown in FIGS. 2 and 10.

As best shown in FIGS. 1-2 and 9-10, the cable puller 20 includes an attachment system 22, a boom 24, a puller head 26, a base portion 28, a securing pin 30 for securing the attachment system 22 to the boom 24, and a pivot shaft 32 for pivotally attaching the boom 24, puller head 26, and base 28. In describing the cable puller 20, the term forward shall refer to elements proximate the attachment system 22 or in the direction of the attachment system 22, and the term rearward shall refer to elements proximate the puller head 26 or in the direction of the puller head 26.

Figure 3:
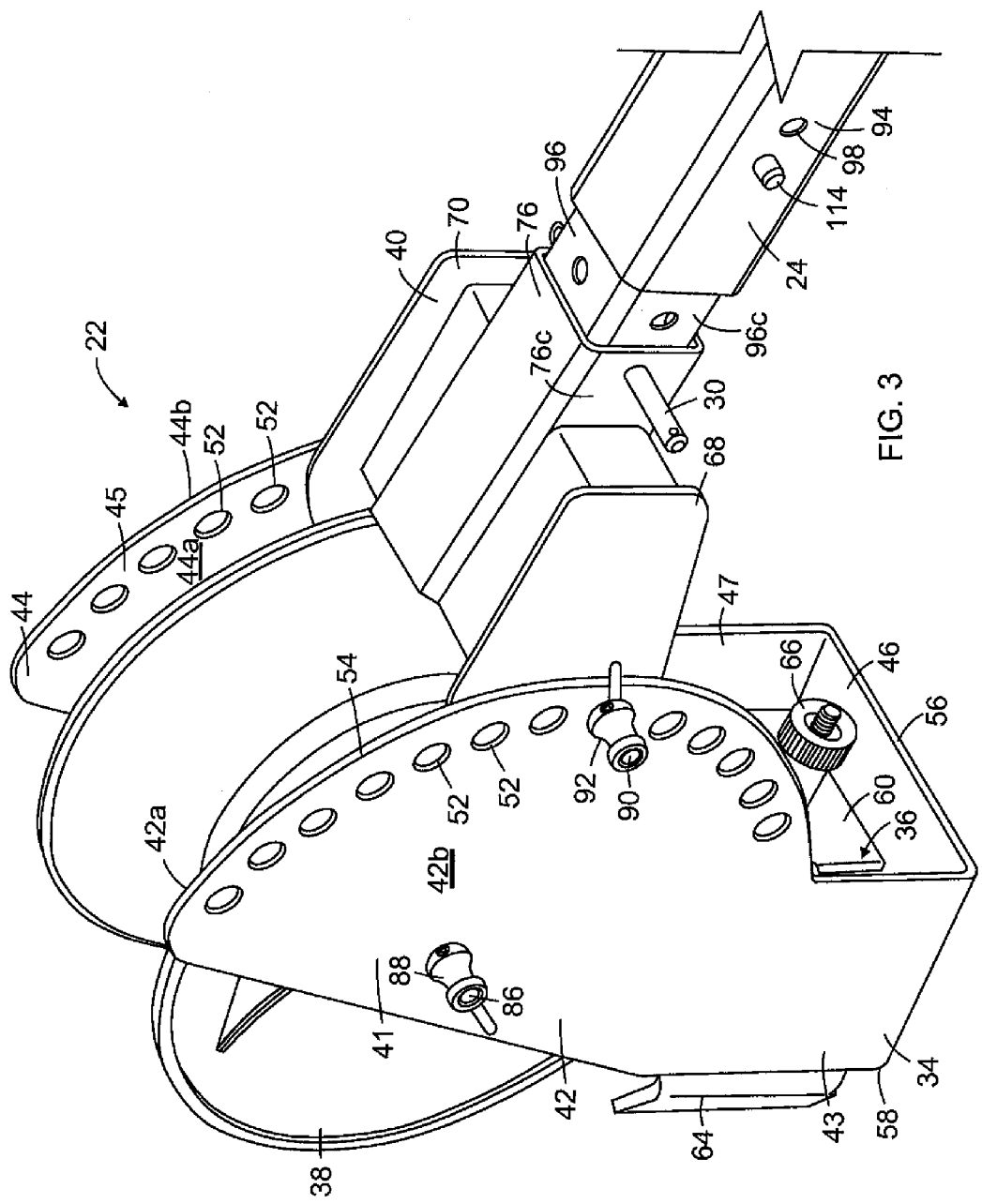
FIG. 3 is an enlarged perspective view of the attachment system and a portion of the boom of the cable puller, with the attachment system shown in an upward cable pulling position.
Figure 4:
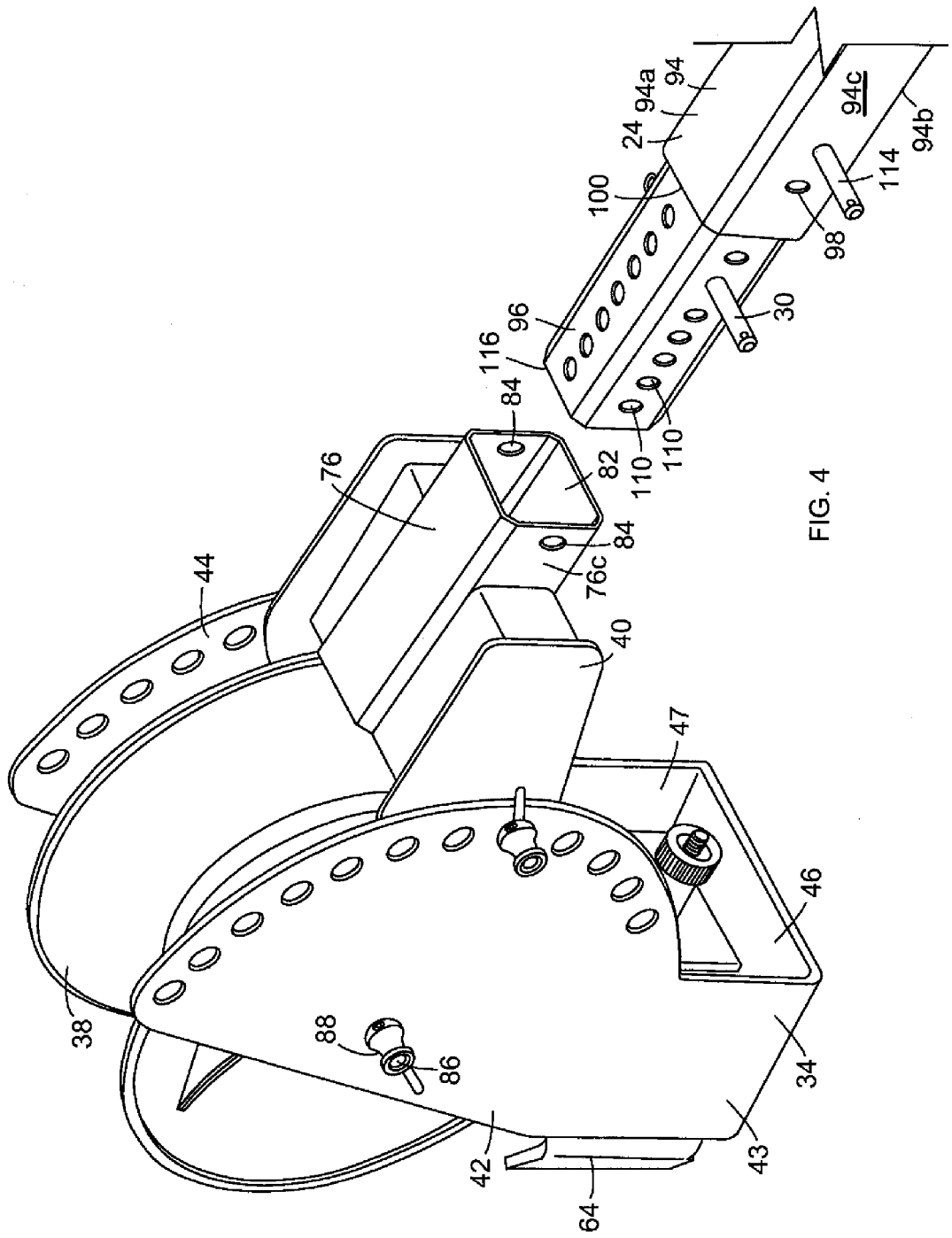
FIG. 4 is a partially exploded perspective view of the attachment system and a portion of the boom of the cable puller shown in FIG. 3.
Figure 5:
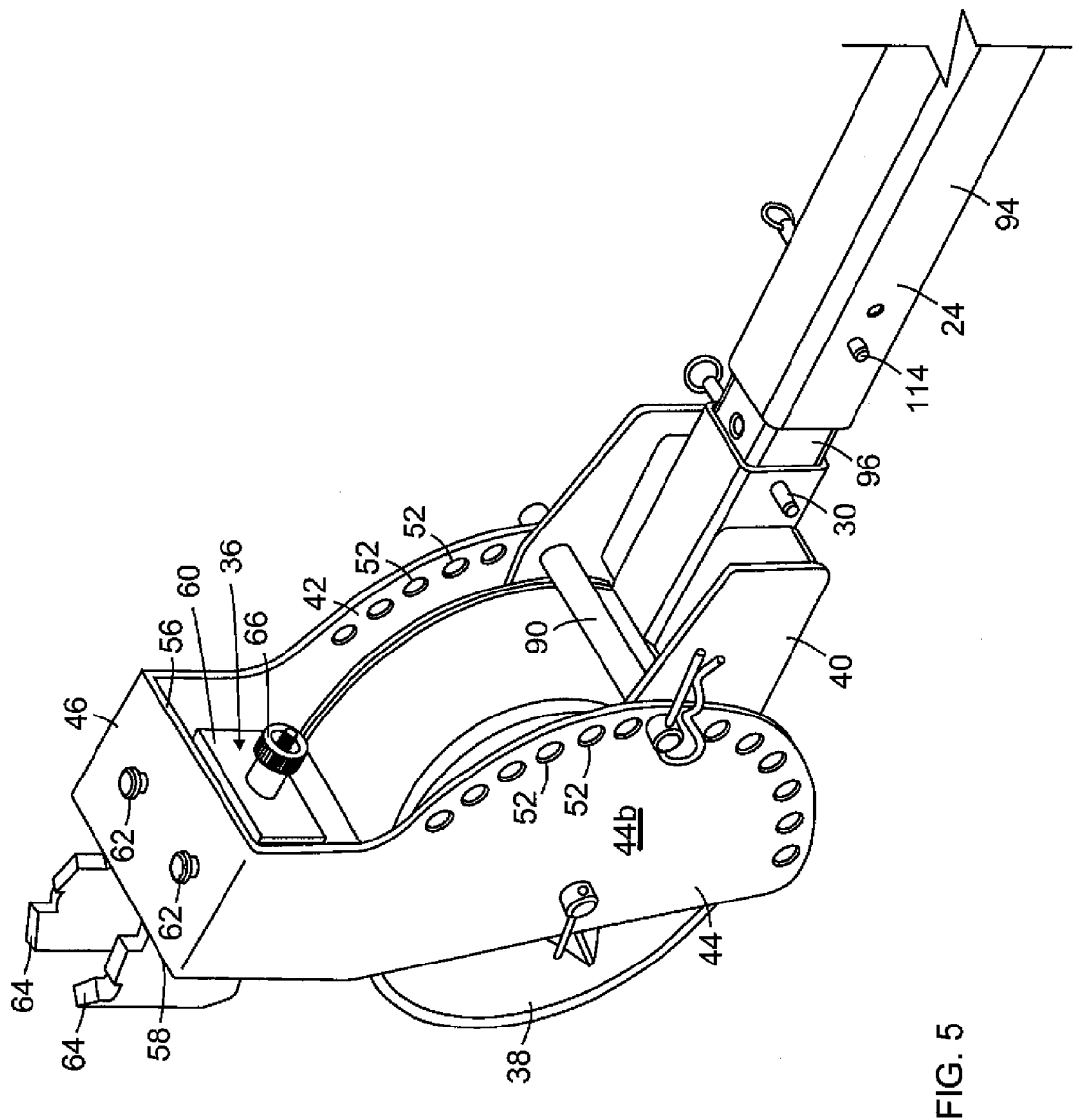
FIG. 5 is an enlarged perspective view of the attachment system and a portion of the boom of the cable puller, with the attachment system shown in a downward cable pulling position.

The attachment system 22 is best shown in FIGS. 3-5. The attachment system 22 includes an elbow 34, a clamping assembly 36, a roller 38, and a mounting bracket 40.

The elbow 34 includes a first plate 42 including a semi-circular portion 41 and an extension 43, a second plate 44 including a semi-circular portion 45 and an extension 47, and a cross piece 46. The first plate 42 is generally parallel to the second plate 44. The first plate 42 is spaced from the second plate 44 by cross piece 46 such that a gap is provided between the first and second plates 42, 44. The cross piece 46 extends from an end of the extension 43 of first plate 42 to an end of the extension 47 of second plate 44 and is generally perpendicular to the first and second plates 42, 44. The crosspiece includes a rearward edge 56 and a forward edge 58. Each plate 42, 44 includes an inner surface 42a, 44a and an outer surface 42b, 44b. Mounting apertures (not shown) are provided at the axial center of semicircular portions 41, 45 of the first and second plates 42, 44. The semi-circular portion 41, 45 of each first and second plate 42, 44 includes a plurality of pin apertures 52 spaced from an arc-shaped edge 54 of the semi-circular portion. The pin apertures 52 of the first plate 42 are aligned with the pin apertures 52 of the second plate 44 to define a pin axis extending from the first plate 42 to the second plate 44.

The clamping assembly 36 includes a push block 60 and spaced apart first and second gripping members 64. The push block 60 is mounted between the extensions 43, 47 of the first and second plates 42, 44. The gripping members are mounted to the cross piece 46 through pins 62 (see FIG. 5). The distance between the gripping members 64 can be adjusted through the push block 60 and a screw adjuster 66. The clamping assembly 36 can be for example similar to the clamping system disclosed in U.S. Patent Publication No. 2007/0284559, the content of which is herein incorporated by reference in its entirety. Alternatively, the clamping assembly 36 can be substituted with any clamping assembly known in the art.

The roller 38 is tapered. A central passageway (not shown) is provided at the axial center of the roller 38 and is aligned with the mounting apertures of the first and second plates 42, 44 of the elbow 34.

Figure 6:
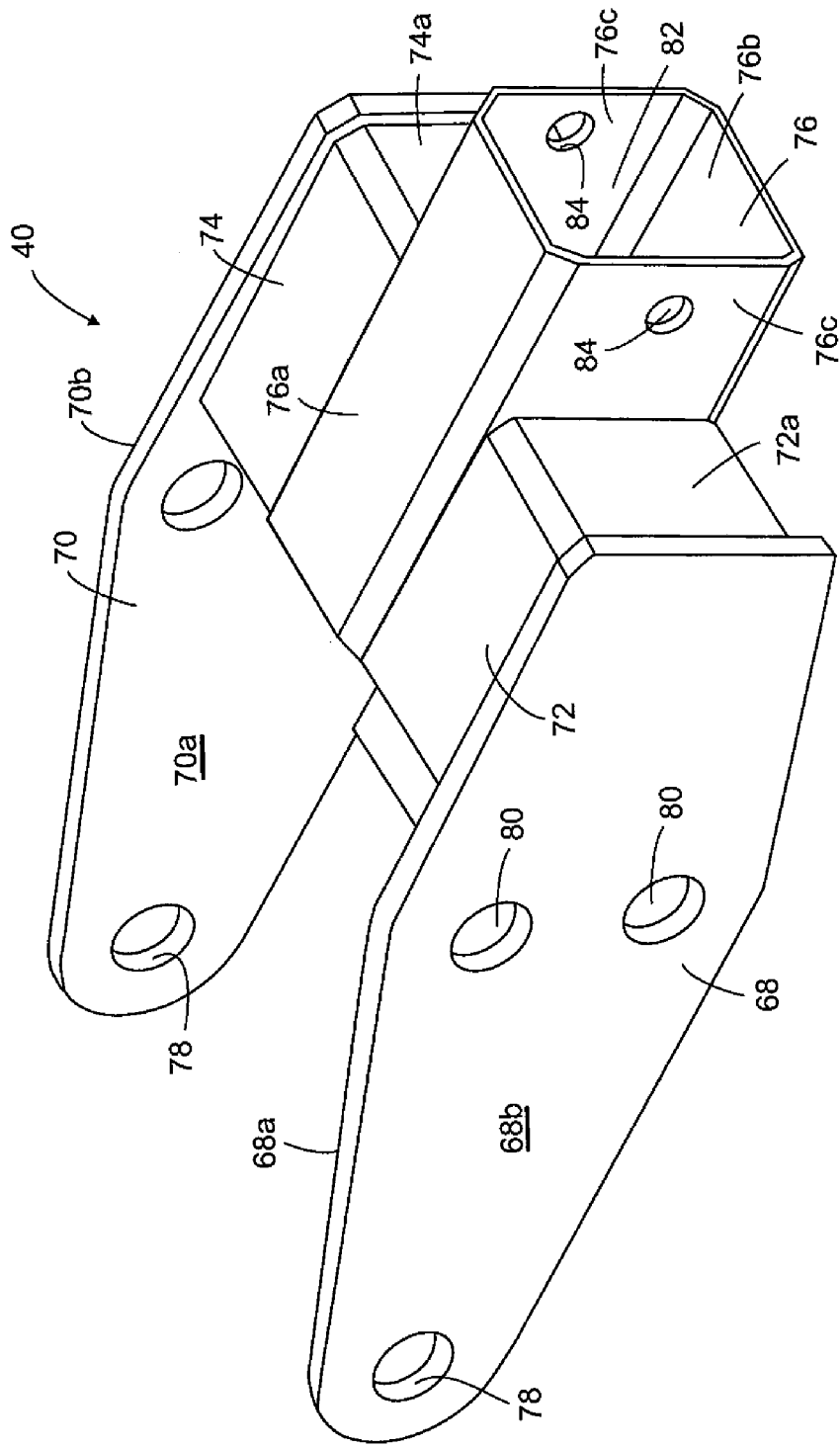
FIG. 6 is a perspective view of the mounting bracket of the cable puller.

As best shown in FIG. 6, the mounting bracket 40 includes a first ear 68, a second ear 70, first and second rectangularly-shaped support members 72, 74, and a central tubular member 76. The first and second ears 68, 70 are positioned generally parallel to each other and are spaced apart from each other by the first and second support members 72, 74 and the central tubular member 76, such that a gap is provided between a portion of the first and second ears 68, 70.

Each ear 68, 70 includes an inner surface 68a, 70a and an outer surface 68b, 70b. Mounting apertures 78 are provided at the forward ends of the ears 68, 70. A pair of adjustment apertures 80 is provided through each ear 68, 70 and are positioned rearward of the respective mounting apertures 78. The first support member 72 extends inwardly from the inner surface 68a of the first ear 68 and the second support member 74 extends inwardly from the inner surface 70a of the second ear 70. The tubular member 76 is mounted between the first and second support members 72, 74 and generally extends rearwardly of the adjustment apertures 80. The tubular member 76 has a square cross-section and a portion of the tubular member 76 extends rearward of the rearward most ends 72a, 74a of the first and second support members 72, 74. The generally square cross section of the tubular member 76 is provided by a first wall 76a, a second wall 76b, and side walls 76c. The tubular member 76 defines a boom passageway 82. Boom mounting apertures 84 are provided through side walls 76c of the tubular member 76. The first and second ears 68, 70, first and second support members 72, 74 and tubular member 76 are preferably welded together to form the mounting bracket 40.

The outer surfaces 68b, 70b of the first and second ears 68, 70 of the mounting bracket 40 are positioned proximate the inner surfaces 42a, 44a of the first and second plates 42, 44 of the elbow 34 and the roller 38 is positioned within the gap between the first and second ears 68, 70, such that the central passageway of the roller 38, the mounting apertures 78 of the first and second ears 68, 70 of the mounting bracket 40 and the mounting apertures of the first and second plates 42, 44 of the elbow 34 are aligned. A roller mounting shaft 86 extends through the mounting aperture of the second plate 44 of the elbow, through the mounting aperture 78 of the second ear 70 of the mounting bracket 40, through the central passageway of the roller 38, through the mounting aperture 78 of the first ear 68 of the mounting bracket 40, and through the mounting aperture of the first plate 42 of the elbow 34. A retaining member 88 is mounted to the end of the roller shaft 86 to secure the elbow 34, mounting bracket 40 and roller 38 together. An angle adjustment pin 90 extends through a pin aperture 52 in the first plate 42 of the elbow 34, through a pair of adjustment apertures 80 of the mounting bracket 40 and through a pin aperture 52 of the second plate 44 to secure the relative positions of the elbow 34 and the mounting bracket 40. A retaining member 92 is mounted to the end of the angle adjustment pin 90 to prevent the pin 90 from disengaging with the elbow 34 and mounting bracket 40.

Although a particular attachment system 22 has been shown and described, it is to be understood that any attachment system known in the art can be substituted for the attachment system 22 shown and described.

The boom 24 includes an outer member 94 and an inner member 96. Each of the outer and inner members 94, 96 is tubularly-shaped and has a square cross-section. The outer member 94 includes an upper wall 94a, a lower wall 94b and side walls 94c. Adjustment apertures 98 are provided through the side walls 94c of the outer member 94 proximate a forward end 100 thereof. The adjustment apertures 98 are aligned to provide pairs of apertures spaced along the length of the outer member 94. The rear end 104 of the outer member is best shown in FIG. 8. A pair of pivot shaft apertures (not shown) is provided through the side walls 94c of the outer member 94 proximate the rearward end 104 of the outer member 94. The pivot shaft 32 extends through the pair of pivot shaft apertures. A pair of retaining shaft apertures 106 are provided at the rearward end 104 of the outer member 94 rearward of the pivot shaft apertures. An inner member passageway 108 is defined by the outer member 94.

The inner member 96 of the boom 24 is best shown in FIG. 7. The inner member 96 includes an upper wall 96a, a lower wall 96b, and side walls 96c. The inner member 96 of the boom 24 includes a forward end 116 and a rearward end 118. A plurality of adjustment apertures 110 are provided through the upper, lower and side walls 96a, 96b, 96c of the inner member 96. The adjustment apertures 110 of the upper and lower walls 96a, 96b are aligned to provide pairs of apertures spaced along the length of the inner member 96. The adjustment apertures 110 of the side walls 96c are aligned to provide pairs of apertures spaced along the length of the inner member 96. A central passageway 112 is defined by the inner member 96.

The outer and inner members 94, 96 are configured and dimensioned to position the inner member 96 slidably within the inner member passageway 108 of the outer member 94, so that a pair of adjustment apertures 98 of the outer member 94 are aligned with a pair of adjustment apertures 110 of the inner member 96. A boom adjustment pin 114, see FIG. 5, extends through a pair of adjustment apertures 98 of the outer member 94 and through a pair of adjustment apertures 110 of the inner member 96 to secure the position of the inner member 96 relative to the outer member 94. Because the inner member 96 is relatively long, the extent to which the user can adjust the length of the boom 24 is extensive.

As best shown in FIGS. 4 and 5, the forward end 116 of the inner member 96 of the boom 24 is positioned within the boom passageway 82 of the tubular member 76 of the mounting bracket 40. A pair of adjustment apertures 110 of the inner member 96 are aligned with the boom mounting apertures 84 of the tubular member 76 of the mounting bracket 40. The securing pin 30 extends through the side wall 76c of the tubular member 76, through a side wall 96c of the inner member 96 of the boom 24, through the opposite side wall 96c of the inner member 96 of the boom 24, and through the opposite side wall 76c of the tubular member 76 of the mounting bracket 40 to secure the mounting bracket 40 to the boom 24.

The puller head 26 is best shown in FIG. 8. The puller head 26 generally includes a forward end 121 and a rearward end 123. The puller head 26 also generally includes a frame 122, a gear box 124, a motor 126, a capstan 128, a rear brace 130, and a spool 132. The frame 122 includes first and second ears 134, 136 which are positioned generally parallel to each other. Each ear 134, 136 includes an inner surface 134a, 136a and an outer surface 134b, 136b. A gap is provided between the inner surfaces 134a, 136a of the ears 134, 136. A pair of pivot shaft apertures (not shown) is provided at the forward ends 138 of the ears 134, 136 and form a pivot axis. A first pair (not shown) of retaining shaft apertures is provided through the ears 134, 136, rearward of the pivot shaft apertures and form a first retaining shaft axis which defines a first retaining shaft passageway. A first retaining shaft 140 extends through the first pair of retaining shaft apertures. The first retaining shaft 140 further includes first and second roll pins (not shown) spaced along the length of the first retaining shaft 140. A second pair of retaining shaft apertures 142 is provided through the ears 134, 136, rearward of the pivot shaft apertures and above the first retaining shaft 140 and form a second retaining shaft axis which defines a second retaining shaft passageway. A second retaining shaft 144 extends through the second pair of retaining shaft apertures 142. The second retaining shaft 144 includes first and second roll pins 146, 148 spaced along the length of the second retaining shaft 144. The roll pins 146, 148 are spaced to maintain the second retaining shaft 144 on the frame 122 as the retaining shaft 144 is moved from the engaged position to the disengaged position as will be described herein. The gear box 124 is positioned within the gap between the ears 134, 136 and is secured to the ears 134, 136 with bolts 150. The motor 126 is mounted to the outer surface of the second ear 136. The motor 126 includes a shaft (not shown) extending through the second ear 136 and configured to drive the gear box 124. The capstan 128 is mounted to the outer surface of the first ear 134 and is driven by the gear box 124. As shown, the capstan 128 is spaced rearwardly of the boom 24. Rear brace apertures 152 are provided at the rear ends of the ears 134, 136. The rear brace 130 extends through the rear brace apertures 152. The rear brace 130 is tubular and has a square cross-section. The spool 132 is mounted to an upper wall 132a of the rear brace 130 at an end thereof. First and second retaining pins 154 are spaced along the length of the rear brace 130. The first retaining pin 154 is positioned proximate the outer surface of the first ear 134 and the second retaining pin (not shown) is positioned proximate the outer surface of the second ear 136.

As best shown in FIGS. 1 and 2, the base 28 includes a T-shaped member 156, an upright extension 158, and two wheels 160. The T-shaped member 156 generally includes a horizontal portion 162 and a vertical portion 164. The vertical portion 164 extends upwardly from a mid point of the horizontal portion 162. The vertical portion 164 is generally tubular and has a square-shaped cross-section. The vertical portion 164 includes a front wall 164a, a rear wall 164b and side walls 164c. A plurality of adjustment apertures 166 are provided through the side walls 164c of the vertical portion 164 to provide pairs of adjustment apertures 166 spaced along the length of the vertical portion 164. A wheel 160 is mounted at each end of the horizontal portion 162 and is retained on the horizontal portion 162 with a cotter pin 168. The wheels 160 allow the user to easily transport the cable puller 20 to a pull site. The upright extension 158 is generally tubular and includes a square-shaped cross-section defining a base passageway 171 therethrough. The upright extension 158 includes a front wall 158a, a rear wall 158b, and side walls 158c. As shown in FIG. 2, a plurality of pivot shaft apertures 170 are provided through the side walls 158c of the upright extension 158, proximate an upper end of the upright extension 158 to provide pairs of pivot shaft apertures 170. A pair of adjustment apertures (not shown) is provided at the lower end of the upright extension 158. The vertical portion 164 of the T-shaped member 156 is positioned within the base passageway of the upright extension 158. The adjustment apertures of the upright extension 158 are aligned with a pair of adjustment apertures 166 through the vertical portion 164 of the T-shaped member 156. A pin 174 extends through the side wall 158c of the upright extension 158, through the opposite side walls 164c of the vertical portion 164 of the T-shaped member 156, and through the opposite side wall 158c of the upright extension 158 to secure the relative positions of the upright extension 158 and the vertical portion 164 of the T-shaped member 156.

The outer surface 134b of the first ear 134 of the frame 122 of the puller head 28 is positioned proximate the outer surface of the side wall 94c of the outer member 94 of boom 24 such that the pivot shaft apertures of the first and second cars 134, 136 of the frame 122 are aligned with the pivot shaft apertures through the outer member 94 of the boom 24. In addition, the upper end 176 of the upright extension 158 of the base 28 is positioned between the ears 134, 136 of the frame 122 of the puller head 26 such that a pair of pivot shaft apertures 170 of the upright extension 158 are aligned with the pivot shaft apertures of the first and second ears 134, 136 of the frame 122 of the puller head 26 and with the pivot shaft apertures through the outer member 94 of the boom 24. The pivot shaft 32 extends through the side walls 94c of the outer member 94 of the boom 24, through a first ear 134 of the frame 122 of the puller head 26, through the side walls 158c of the upright extension 158 of the base member 28 and through the second ear 134 of the frame 122 to pivotally secure the forward end 121 of the puller head 26, the boom 24 and the base member 28 together while the rear end 123 of the puller head 126 remains free.

The cable puller 20 can be assembled and adjusted to provide upward or downward pulling. Assembly and adjustment of the cable puller 20 to provide upward pulling is shown in FIGS. 1 and 9. Assembly and adjustment of the cable puller 20 to provide downward pulling is shown in FIGS. 2 and 10.

In the upward pulling position, the attachment system 22 is mounted to the boom 24 such that the gripping members 64 of the clamping assembly 36 are positioned downward as shown in FIGS. 1 and 9. The angle adjustment pin 90 is then removed from the elbow 34 and the mounting bracket 40 to allow the elbow 34 to rotate about the roller mounting shaft 86. When the gripping members 64 are positioned around the conduit 178 through which the cable is to be pulled (see FIGS. 9 and 10). The angle adjustment pin 90 is then reinserted through the pin apertures 52 of the plates 42, 44 of the elbow 34 which are aligned with a pair of adjustment apertures 80 of the mounting bracket 40 to fix the angle of the elbow 34 relative to the mounting bracket 40. In addition, the screw adjuster 66 is rotated to clamp the conduit 178 with the gripping members 64.

Next, the length of the boom 24 is adjusted by removing the adjustment pin 114 and sliding the inner member 96 of the boom 24 relative to the outer member 94 of the boom 24. The boom adjustment pin 114 is then reinserted through the aligned adjustment apertures 98, 110 of the outer and inner members 94, 96 of the boom 24 to secure the relative positions of the outer and inner members 94, 96.

When upward pulling is to be performed, the second retaining shaft 144 of the puller head 26 is disengaged from the retaining shaft apertures 106 of the outer member 94 of the boom 24 until the first roll pin 146 contacts the inner surface of the second ear 136 of the puller head 26. In addition, the first retaining shaft 140 is aligned with the retaining shaft apertures 106 of the outer member 94 of the boom 24 and slidingly engaged with the outer member 94 of the boom 24 until the first retaining shaft 140 is positioned within the retaining shaft apertures 106 and an end of the first retaining shaft 140 extends beyond the outer surface of the side wall 94c of the outer member 94 of the boom 24, as shown in FIGS. 1, 8 and 9. A cotter pin 182 is then engaged with the end of the first retaining shaft 140 to prevent the first retaining shaft 140 from exiting the boom 24. In this upward pulling position the first retaining shaft 140 is located substantially in the same plane as the pivot shaft 32 and the axial center of the capstan 128.

The height of the rear end of the boom 24 can be adjusted by removing the base pin 174 from the base 28 and the upright extension 158 of the base 28 is raised or lowered relative to the vertical portion 164 of the T-shaped member 156 to position the rear end 104 of the boom 24 at the appropriate height relative to the floor. When the appropriate height is achieved, the base pin 174 is reinserted through the upright extension 158 and the vertical portion 164 of the T-shaped member 156 of the base 28.

As shown in FIG. 9, when the cable puller 20 is positioned in the upward pulling position, an upper most portion of the receiving surface of the capstan 128, upon which the pulling rope 180 to be pulled passes, is aligned with the boom 24 and is positioned above the plane in which the upper surface of the upper wall 94a of the boom 24 is positioned. Thus, the pulling rope 180 exiting the conduit 178 will pass over the roller 38, over the boom 24, contact the upper tangent of the capstan 128, wind around the capstan 128, and wind around the spool 132 to ensure that the motor 126 and capstan 128 supply the necessary force to effectuate cable pull.

The user can easily convert the cable puller 20 to the downward pulling position shown in FIGS. 2 and 10. First, the user disengages the gripping members 64 from the conduit 178. Next, the user removes the securing pin 30 to remove the attachment system 22 from the boom 24. The user then inverts the attachment system 22 such that the gripping members 64 are positioned upward. The user then inserts the forward end of the inner member 96 of the boom 24 into the boom passageway 82 of the mounting bracket 40. The securing pin 30 is then reinserted through the boom mounting apertures 84 of mounting member 40 and through a pair of adjustment apertures 110 of the inner member 96 of the boom 24 to reattach the attachment system 22. The angle adjustment pin 90 is removed from the elbow 34 and the mounting bracket 40 to allow the elbow 34 to rotate about the roller shaft 86 and the angle between the elbow 34 and the mounting bracket 40 is achieved in the same manner as when the cable puller 20 is in the upward pulling position. Next, the length of the boom 24 is adjusted by removing the adjustment pin 114 and sliding the inner member 96 of the boom 24 relative to the outer member 94 of the boom. The boom adjustment pin 114 is then reinserted through the outer and inner members 94, 96 of the boom 24 to secure the relative positions of the outer and inner members 94, 96.

When downward pulling is to be performed, the cotter pin 182 is removed, and the first retaining shaft 140 of the puller head 26 is disengaged from the shaft retaining apertures 106 of the outer member 94 of the boom 24 until the first roll pin of the first retaining shaft 140 contacts the inner surface 136a of the second ear 136 of the puller head 26. In addition, the second retaining shaft 144 is aligned with the retaining shaft apertures 106 of the outer member 94 of the boom 24 and slidingly engaged with the outer member 94 of the boom 24 until the second retaining shaft 144 is positioned within the retaining shaft apertures 106 and an end of the second retaining shaft 144 extends beyond the outer surface of the side wall 94c of the outer member 94 of the boom 24, as shown in FIGS. 2 and 10. The cotter pin 182 is then engaged with the end of the second retaining shaft 144 to prevent the second retaining shaft 144 from exiting the boom 24. In this downward pulling position the second retaining shaft 144 is located substantially in the same plane as the pivot shaft 32. The axial center of the capstan 128 is positioned below the lower surface 94*b* of the outer member 94.

As with the height adjustment in the upward pulling position, the height of the rear end 104 of the boom 24 can be adjusted by removing the base pin 174 from the base 28 and the upright extension 158 of the base member 28 is raised or lowered relative to the vertical portion 162 of the T-shaped member 156 to position the rear end 104 of the boom 24 at the appropriate height relative to the floor. When the appropriate height is achieved, the base pin 174 is reinserted through the T-shaped member 156 and upright extension 158 of the base member 28.

As shown in FIG. 10, when the boom 24 is engaged with the second retaining shaft 144 to position the cable puller 20 in the downward pulling position, an upper most portion of the receiving surface of the capstan 128 upon which the cable to be pulled will pass is aligned with the boom 24 and is positioned below the plane in which the lower surface of the bottom wall 94*c* of the outer member 94 of the boom 24 is positioned. Thus, the pulling rope 180 exiting the conduit 178 will pass under the roller 38, under the boom 24, and contact the upper tangent of the capstan 128, wind around the capstan 128, and wind around the spool 132 to ensure that the motor and capstan 128 supply the necessary force to effectuate cable pull.

The cable puller 20 therefore, allows a user to easily switch the cable puller 20 from the upward pulling mode to the downward pulling mode by simply removing the attachment system 22 from the boom 24, inverting the attachment system 22, re-mounting the attachment system 22, removing the cotter pin 182 from the first retaining shaft 140, sliding the first retaining shaft 140 relative to the boom 24, engaging the second retaining shaft 144 with the boom 24, and inserting the cotter pin 182 in the second retaining shaft 144.

As can be seen, this invention provides a fast and easy way to switch the cable puller 20 between upward and downward cable pulling modes of operation without requiring inversion of the entire cable puller and without requiring the use of additional rollers. Although a preferred embodiment has been described including use of a pivoting connection between the puller head 26 and the boom 24, along with a certain type of a clamping assembly 36, it is contemplated that those skilled in the art may achieve the invention in other ways by using other types of conduit clamping assemblies and other types of connections between the boom 24 and puller head 26 of a cable puller 20. Alternatively, a fixed frame 122 with a movable capstan 128 could also be employed.

It should be understood that an upward cable pulling mode of operation for this cable puller 20 includes not only pulling the cable substantially vertically out of a conduit 178, but can also include other situations where the cable or rope 180 comes up out of a conduit 178 at an angle that is oblique to the horizontal plane. Likewise, a downward cable pulling mode of operation for this cable puller 20 includes situations where the cable or rope 180 comes down out of a conduit 178 at any angle that is oblique to the horizontal plane in addition to a substantially downward vertical direction. Thus this construction allows the user to accommodate many cable pulling scenarios that can be encountered in the field.

While a preferred embodiment of the present invention is shown and described, it is envisioned that those skilled in the art may devise various modifications of the present invention without departing from the spirit and scope of the appended claims.

The invention claimed is:

1. A cable puller comprising:
a boom having forward and reward ends;
a conduit attachment system provided at said forward end of said boom;
a frame defining a pivot axis for pivotally mounting said frame to said rearward end of said boom, a first retaining shaft passageway provided by said frame and spaced from said pivot axis, and a second retaining shaft passageway provided by said frame and spaced from said first retaining shaft passageway;
a capstan mounted to said frame, said capstan having an axis of rotation parallel to said pivot axis;
at least one retaining shaft slideably engaged with said frame, said at least one retaining shaft extending through at least one of said first retaining shaft passageway and said second retaining shaft passageway and capable of being engaged with said boom, wherein when said at least one retaining shaft is engaged with the boom, the puller head is in one of an upward cable pulling position and a downward cable pulling position.

2. The cable puller as defined in claim 1 wherein said pivot axis, said first retaining shaft passageway and said second retaining shaft passageway are parallel to each other.

3. The cable puller as defined in claim 1, further comprising a gear box and a motor and wherein said capstan is driven by said motor through said gear box.

4. The cable puller as defined in claim 1, wherein each said retaining shaft includes a retaining pin which engages said frame to limit the movement of said at least one retaining shaft relative to said frame.

5. The cable puller as defined in claim 1, wherein said at least one retaining shaft comprises a first retaining shaft positioned within said first retaining shaft passageway and a second retaining shaft positioned in said second retaining shaft passageway.

6. A cable puller comprising:
a base;
a boom having a forward end, a rearward end, an upper surface and a lower surface, said boom attached to said base proximate said rearward end;
an attachment system removably attached to said boom proximate said forward end of said boom for attachment of said cable puller to a conduit, wherein said attachment system is attached to said boom in one of an upward cable pulling position or a downward cable pulling position,
a puller head proximate said rearward end of said boom, said puller head including a motor, a capstan driven by said motor and having an axis of rotation, and a first pivot axis parallel to said axis of rotation; and
a pivot shaft positioned at said first pivot axis for pivotally coupling said puller head to said boom and for positioning said capstan in one of an upward pulling position and a downward pulling position;
wherein when said attachment system is attached to said boom in an upward pulling position said capstan is positioned in an upward pulling position and when said attachment system is attached to said boom in a downward pulling position said capstan is positioned in a downward pulling position.

7. A cable puller as defined in claim 6, wherein when said attachment system and said capstan are positioned in an upward pulling position, a cable to be pulled is positioned proximate said upper surface of said boom and when said attachment system and said capstan are positioned in a downward pulling position, a cable to be pulled is positioned proximate said lower surface of said boom.

8. A cable puller as defined in claim 6, wherein said boom includes an inner member and an outer member slideably engaged with said inner member for varying the length of said boom.

9. A cable puller as defined in claim 6, wherein said attachment system includes a mounting bracket which receives said forward end of said boom, a clamping assembly for engaging a conduit, and an elbow pivotally mounted to said mounting bracket for changing the position of said clamping assembly relative to said mounting bracket.

10. A cable puller as defined in claim 6, wherein said attachment system includes a roller.

11. A cable puller as defined in claim 6, wherein said puller head includes:
a frame having a first retaining shaft passageway spaced from said first pivot axis, a second retaining shaft passageway spaced from said first pivot axis, at least one retaining shaft slideably engaged with said frame, wherein said at least one retaining shaft extends through at least one of said first retaining shaft passageway and said second retaining shaft passageway and engages said boom to secure the puller head in one of said upward cable pulling position or said downward cable pulling position.

12. A cable puller as defined in claim 11, where when said puller head is positioned in said upward pulling position, each of said pivot shaft, said at least one retaining shaft and said axis of rotation of said capstan are positioned in a common plane.

13. A cable puller as defined in claim 11, where when said puller head is positioned in said downward pulling position, said pivot shaft and said at least one retaining shaft are positioned in a common plane and said axis of rotation of said capstan is not positioned in said common plane.

14. A cable puller as defined in claim 6, wherein said base further includes wheels for transportation of said cable puller.

15. A cable puller comprising:
a base;
a generally elongated boom having a forward end, a rearward end, an upper surface and a lower surface, said boom attached to said base proximate said rearward end;
an attachment system removably attached to said boom proximate said forward end of said boom for attachment of said cable puller to a conduit, wherein said attachment system is attached to said boom in one of an upward cable pulling attachment position or a downward cable pulling attachment position,
a puller head moveably attached to said boom and provided proximate to said rear end of said boom, said puller head including a motor, and a capstan driven by said motor and having an axis of rotation, said puller head being moveable relative to said boom between an upward cable pulling puller head position and a downward cable pulling puller head position; and
wherein when said attachment system is attached to said boom in said upward cable pulling attachment position, said puller head is positioned in said upward cable pulling puller head position and when said attachment system is attached to said boom in said downward cable pulling attachment position, said puller head is positioned in a downward cable pulling puller head position.

16. A cable puller as defined in claim 15, wherein said puller head further includes a pivot axis and said puller head is pivotally mounted to said boom.

17. A cable puller as defined in claim 16, wherein is said pivot axis is parallel to said axis of rotation of said capstan.

18. A cable puller comprising:
a base;
a boom having a forward end, a rearward end, an upper surface and a lower surface, said boom attached to said base proximate said rearward end of said boom;
an attachment system removably attached to said boom proximate said forward end of said boom for attachment of said cable puller to a conduit, wherein said attachment system is attached to said boom in one of an upward cable pulling position and a downward cable pulling position; and
a puller head having a forward end and a rearward end and including a motor and a capstan driven by said motor, said forward end of said puller head pivotally coupled to said rearward end of said boom and said rearward end of said puller head being free, wherein said puller head is pivoted relative to said boom to move said puller head from an upward pulling puller head position to a downward pulling puller head position.

19. A method for switching a cable puller between an upward cable pulling position and a downward cable pulling position comprising
providing a boom having a forward end, a rearward end, an upper surface and a lower surface;
providing an attachment system at said forward end of said boom for attaching the cable puller to a conduit;
providing a puller head proximate said rearward end of said boom, said puller head comprising a capstan rearward of said boom, said capstan having a receiving surface on which said cable to be pulled is wound, said capstan positioned such that an upper most portion of said receiving surface is aligned with one of said upper and lower surfaces of said boom;
and
changing the position of said capstan relative to said boom such that said upper most portion of said receiving surface of said capstan is aligned with an opposite one of said upper and lower surfaces of said boom.

20. The method of claim 19, wherein providing a puller head includes pivotally mounting said puller head to said boom, and changing the position of said capstan includes rotating said puller head relative to said boom.

21. The method of claim 20, further including
providing a retaining shaft;
wherein providing a puller head includes providing first and second retaining shaft passageways through said puller head;
wherein providing a boom includes providing a retaining shaft passageway through said boom; and
wherein changing said position of said capstan includes engaging said retaining shaft with one of said first and second retaining shaft passageways through said puller head and said retaining shaft passageway of said boom to secure the relative positions of said puller head and said boom.

22. The method of claim 19, further including removing said attachment system from said boom;
inverting said attachment system;
mounting said attachment system to said forward end of said boom.

* * * * *